(12) United States Patent
Bartosik et al.

(10) Patent No.: US 7,271,760 B2
(45) Date of Patent: Sep. 18, 2007

(54) RADAR DETECTOR FOR A MOTORCYCLE

(75) Inventors: Daniel J. Bartosik, Centerville, OH (US); Timothy Coomer, West Chester, OH (US); Nelson J. Cobb, Palmyra, WI (US); Jeffrey E. Richlen, Oak Creek, WI (US)

(73) Assignees: Harly-Davidson Motor Company Group, Inc., Milwaukee, WI (US); Escort, Inc., West Chester, OH (US)

( * ) Notice: Subject to any disclaimer, the term of this patent is extended or adjusted under 35 U.S.C. 154(b) by 0 days.

(21) Appl. No.: 10/891,212

(22) Filed: Jul. 14, 2004

(65) Prior Publication Data

US 2006/0012509 A1 Jan. 19, 2006

(51) Int. Cl.
*G01S 7/40* (2006.01)

(52) U.S. Cl. .......................... 342/20; 342/175

(58) Field of Classification Search .............. 342/20; 180/9.25, 222, 223

See application file for complete search history.

(56) References Cited

U.S. PATENT DOCUMENTS

| | | | | |
|---|---|---|---|---|
| 3,822,049 A | * | 7/1974 | Saunders | 248/223.41 |
| 4,625,210 A | * | 11/1986 | Sagl | 342/20 |
| 4,747,570 A | * | 5/1988 | Takahashi | 248/309.1 |
| 4,836,482 A | * | 6/1989 | Sokol | 248/206.3 |
| 4,887,753 A | * | 12/1989 | Allen | 224/312 |
| 4,896,855 A | * | 1/1990 | Furnish | 248/206.3 |
| 5,014,947 A | * | 5/1991 | Wang | 248/214 |
| 5,017,144 A | * | 5/1991 | Waidhofer | 439/34 |
| 5,020,754 A | * | 6/1991 | Davis et al. | 248/206.3 |
| 5,034,747 A | * | 7/1991 | Donahue | 342/20 |
| 5,114,060 A | * | 5/1992 | Boyer | 224/413 |
| 5,161,028 A | * | 11/1992 | Kawata et al. | 348/837 |
| 5,452,874 A | * | 9/1995 | Kozloff et al. | 248/222.11 |
| 5,525,989 A | * | 6/1996 | Holt | 342/20 |
| 5,781,145 A | * | 7/1998 | Williams et al. | 342/20 |
| 5,911,395 A | * | 6/1999 | Hussaini | 248/206.3 |
| 5,943,002 A | * | 8/1999 | Ono | 342/20 |

(Continued)

FOREIGN PATENT DOCUMENTS

JP 359018025 A * 1/1984

OTHER PUBLICATIONS

Radar Detectors & Laser Detectors—Escort, Inc. Factory Direct, Website; Oct. 13, 2004; p. 1 of 1.

(Continued)

*Primary Examiner*—Thomas H. Tarcza
*Assistant Examiner*—Matthew M Barker
(74) *Attorney, Agent, or Firm*—Michael Best & Friedrich LLP (57) ABSTRACT

A radar detector for a motorcycle having an electrical power supply and a receiver housing. The radar detector includes a housing adapted to attach to the receiver housing. The housing is divided into a right-hand side and a left-hand side. A plurality of user controls is disposed within the housing. A majority of the controls are disposed on the left-hand side of the housing.

32 Claims, 6 Drawing Sheets

U.S. PATENT DOCUMENTS

| | | | |
|---|---|---|---|
| 6,082,688 A * | 7/2000 | Wilson | 248/222.11 |
| 6,411,502 B1 * | 6/2002 | Burrell | 361/681 |
| 6,639,542 B2 * | 10/2003 | Autio et al. | 342/20 |
| 6,783,040 B2 * | 8/2004 | Batchelor | 224/413 |
| 6,939,155 B2 * | 9/2005 | Postrel | 439/297 |
| 6,950,053 B1 * | 9/2005 | Peterson | 342/20 |
| 2001/0028176 A1 * | 10/2001 | Suzuki et al. | 296/70 |
| 2005/0200514 A1 * | 9/2005 | Peterson | 342/20 |

OTHER PUBLICATIONS

Passport 8500 X50 Radar Detector & Laser Detector—Escort, Inc., website; Oct. 13, 2004; pp. 1-3.

Passport 7500S Radar Detector & Laser Detector—Escort, Inc., Website; Oct. 13, 2004; pp. 1-2.

* cited by examiner

RADAR DETECTOR FOR A MOTORCYCLE

BACKGROUND

The present invention generally relates to motorcycles, and particularly to an electrical device for a motorcycle. More particularly the present invention relates to a radar detector suited for use with a motorcycle.

Motorcycles generally include an electrical system that provides electrical power to the engine, various electrical gauges, lights, and accessories. However, due to the limited space on a motorcycle, it is difficult to use other accessories that are not designed as part of the original equipment for the motorcycle. For example, electronic devices such as radar detectors, MP3 players, CD players, GPS receivers and the like can be connected to the electrical supply system, but it is difficult to attach them to the motorcycle. In addition, the wires and plugs used to connect the devices to the electrical system, as well as the devices themselves, often remain loose. These loose components are more likely to fall from the motorcycle and become damaged.

SUMMARY

The present invention generally provides an electrical accessory such as, but not limited to radar detectors, MP3 players, satellite radios, and GPS receivers. The electrical accessory is adapted to mount to a fixed receiver housing that is attached to the motorcycle. In some constructions, the accessory includes a display that is angled toward the rider to reduce glare and make it easier for the rider to see the display. In addition, in some constructions, the accessory includes a majority of user controls disposed on the left-hand side of the accessory to facilitate ease of operation. In still other constructions, at least one of the user controls is illuminated to make it easy to find in the dark.

BRIEF DESCRIPTION OF THE DRAWINGS

The detailed description particularly refers to the accompanying figures in which.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings.

DETAILED DESCRIPTION OF THE DRAWINGS

Figure 1:
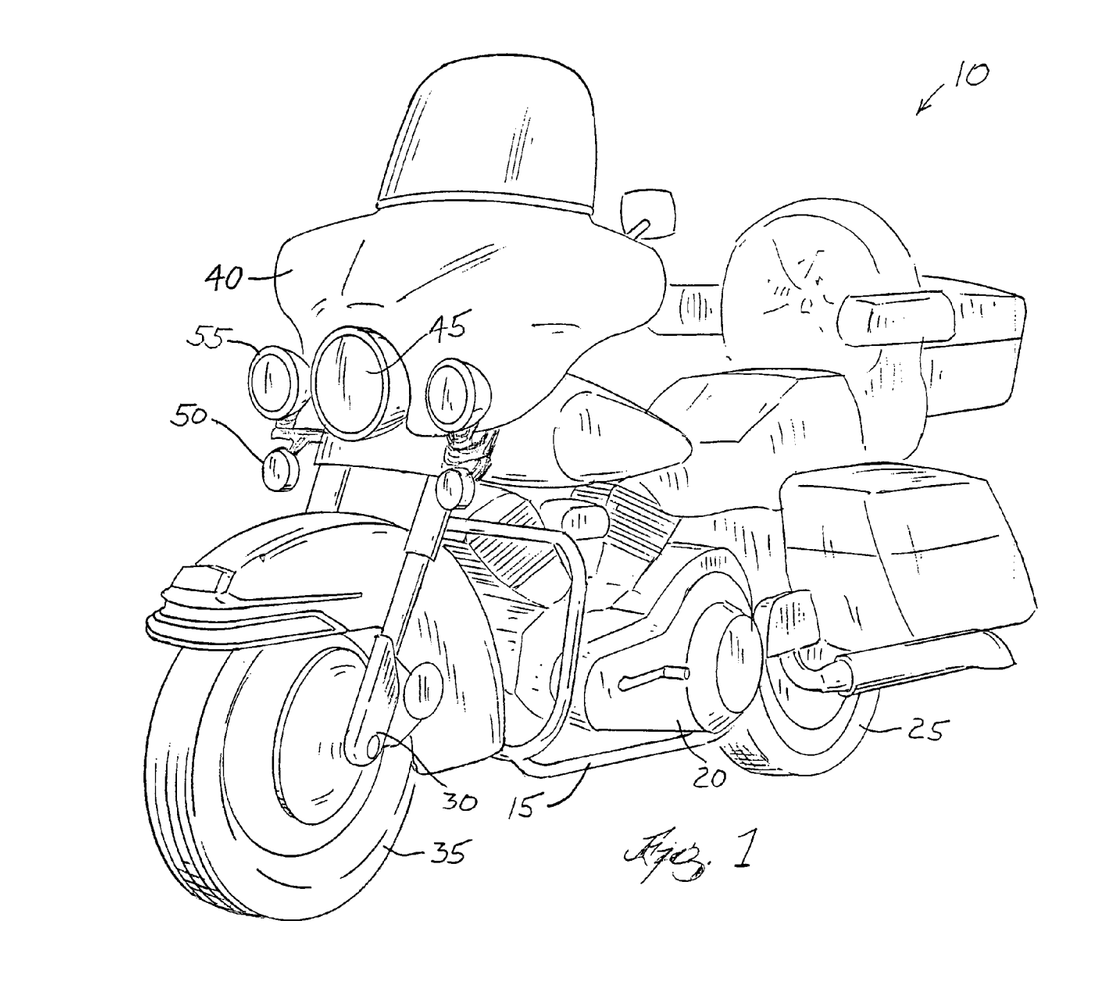
FIG. 1 is a perspective view of a motorcycle.

FIG. 1 illustrates a motorcycle 10 having a frame 15, and an engine and transmission assembly 20 mounted to the frame 15. A rear wheel 25 is interconnected with the frame 15 and supports the rear of the motorcycle 10. The rear wheel 25 is driven by operation of the engine and transmission assembly 20. A steering assembly 30 is pivotally mounted to the frame 15, and a front wheel 35 is mounted to the steering assembly 30 to support the front of the motorcycle 10. A windscreen assembly 40 attaches to the steering assembly 30 such that, as the rider turns or rotates the steering assembly 30, the windscreen assembly 40 also turns or rotates. The motorcycle 10 also includes an electrical system (not shown) that provides electrical power to various devices including the engine and transmission assembly 20, the headlight 45, the turn signals 50, and the passing lights 55.

Figure 2:
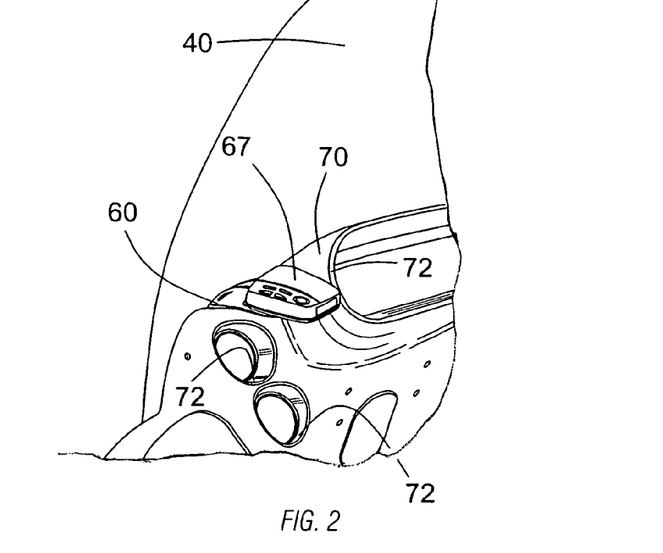
FIG. 2 is a perspective view of a portion of the motorcycle including a receiver housing and a radar detector.
Figure 3:
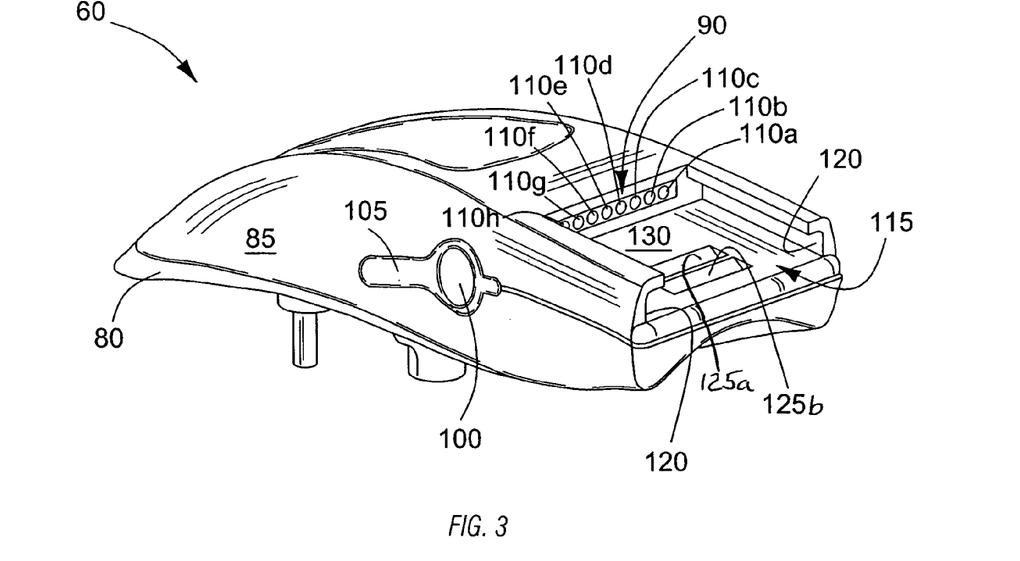
FIG. 3 is a top perspective view of the receiver housing of FIG. 2.
Figure 4:
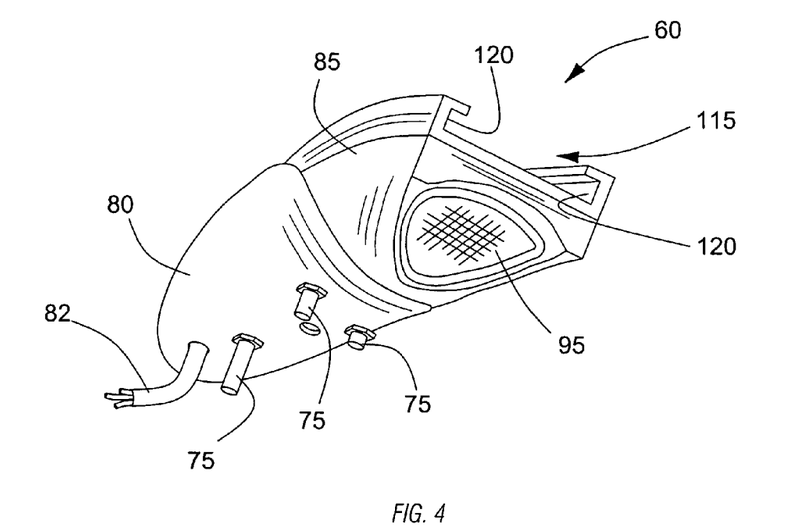
FIG. 4 is a bottom perspective view of the receiver housing of FIG. 3.

FIGS. 2-4 illustrate a receiver housing 60 attached to the windscreen assembly 40 and supporting an electrical accessory, or radar detector 67. Suitable electrical accessories include, but are not limited to radar detectors 67, GPS receivers 68 (FIG. 5) and MP3 players. The receiver housing 60 attaches to a molded piece 70 that defines at least a portion of a motorcycle dashboard. The molded piece 70 includes a plurality of apertures 72 that receive the various dials, gauges and indicators commonly found on a motorcycle. The receiver housing 60 attaches to the molded piece 70 using one or more fasteners 75 (shown in FIG. 4). Suitable fasteners 75 include, but are not limited to screws or studs that pass through the receiver housing 60 and the molded piece 70 and engage a nut or other retaining member.

As shown in FIGS. 3 and 4, a fairing boot 80 surrounds the interface between the receiver housing 60 and the molded piece 70. Generally, molded rubber or other resilient material is well-suited to forming the fairing boot 80. The fairing boot 80 contacts the interfacing surfaces and provides a substantially water-tight seal between the receiver housing 60 and the molded piece 70. In addition, the fairing boot 80 occupies space between the receiver housing 60 and the molded piece 70 to reduce rattling and vibration that may occur during motorcycle operation.

A wiring harness (not shown) is generally disposed behind the molded piece 70 to hide the wires 82 that direct power or other signals to or from the various dials, gauges and indicators disposed within the molded piece 70. At least two wires extend from the wiring harness and connect to the receiver housing 60. One of these wires is a power wire, while the other is a ground wire. Together, the two wires define a portion of a power supply circuit. Other wires may extend from the harness to the receiver housing 60 to connect the receiver housing 60 to other devices such as speakers associated with a motorcycle radio, or lights that could be provided to give the rider a visual indication related to the output of the electrical accessory. In addition, wires could extend from the receiver housing 60 and through the wiring harness to a headphone jack. The headphone jack would be positioned to allow the rider to conveniently plug in headphones and listen to an audio output produced by the electrical accessory.

The receiver housing 60 illustrated in FIGS. 3 and 4 includes an outer case 85 that contains a plurality of connectors 90, a speaker 95, and a headphone jack 100. The speaker 95 is located within the outer case 85 and produces sounds audible by the rider in response to a signal produced by the electrical accessory. For example, if the electrical accessory is a radar detector 67, the speaker 95 may produce various audible tones or clicks representative of the strength and type of electromagnetic radiation the detector 67 is receiving. In another application, the electrical accessory is an MP3 player and the speaker 95 outputs music.

The headphone jack 100 is disposed on the side of the outer case 85 and includes a cover 105 that seals the headphone jack 100 when not in use. The headphone jack 100 receives the same electrical signal as the speaker 95, thus allowing a user to plug headphones into the receiver housing 60 to listen to the output of the electrical accessory through the headphones rather than through the speaker 95.

In many constructions, the plurality of connectors 90 includes a series of pin connectors 110a-110h. The pin connectors 110a-110h extend from the receiver housing 60 and are adapted to engage pin-receiving connectors 112a-112h (shown in FIG. 10) disposed on the radar detector 67. In other constructions, the connectors 90 are reversed such that the pins 110a-110h are part of the radar detector 67, while the pin-receiving portions are part of the receiver housing 60.

Wires, a printed circuit board, and/or other conductors, provide conduction paths between the connectors 110a-110h and other components or wires. For example, a conductor connects with the power wire to deliver power to a power connector or power pin 110a. Another conductor connects the ground wire to a ground connector or ground pin 110h. The power wire and power pin and ground wire and ground pin cooperate to define a portion of the power delivery circuit. Two additional conductors extend between two of the connectors 110f, 110g, and the speaker 95 to partially complete an audio circuit between the electrical accessory and the speaker 95. Additional conductors may be provided for other purposes such as directing signals to external speakers, light-producing devices, or one of the headphone jacks, as already described.

Before describing the arrangement of the pins 110a-110h, it should be understood that the pin-receiving connectors 112a-112h on the radar detector 67 are similarly arranged. Thus, any description of the arrangement of the pins 110a-110h is equally applicable to the arrangement of the pin-receiving connectors 112a-112h. The construction illustrated in FIG. 3 includes eight pins 110a-110h arranged along a substantially straight line. While the pins 110a-110h can be arranged in any order desired, it is preferred to space the power pin 110a some distance from the ground pin 110h. Thus, the first pin is the power pin 110a and the eighth pin is the ground pin 110h. This arrangement places six pins 110b-110g between the power pin 110a and the ground pin 110h. The spacing makes it more difficult for dirt, debris, or water to inadvertently connect the power pin 110a and ground pin 110h and produce a short circuit. Of course other constructions include more or less than eight pins, and still other constructions space the power pin and the ground pin closer to one another or further from one another as desired.

The receiver housing 60 also includes an engagement portion 115 defined as part of the outer case 85. The engagement portion 115 is adapted to engage, support, and retain the electrical accessory in a desired operating position. The engagement portion 115 includes two parallel slots 120 that engage the electrical accessory to restrict the accessory's movement in all directions other than along a path parallel to the slots 120. A locking aperture 125a is disposed in a surface 130 between the two slots 120 and engages a lip 127 formed as part of, or attached to, the electrical accessory to fix the location of the accessory relative to the receiver housing 60. A second locking aperture 125b is positioned adjacent the locking aperture 125a to catch the electrical accessory should the locking member disengage from the locking aperture 125a. The position of the second locking aperture 125b is such that the electrical accessory is not electrically connected to the receiver housing 60 when the locking member engages the second locking aperture 125b. Thus, if the accessory disengages from the locking aperture 125a, the power supply to the electrical accessory will be lost. This will give the rider an indication that the electrical accessory has come loose before the accessory falls out of the receiver housing 60.

Figure 10:
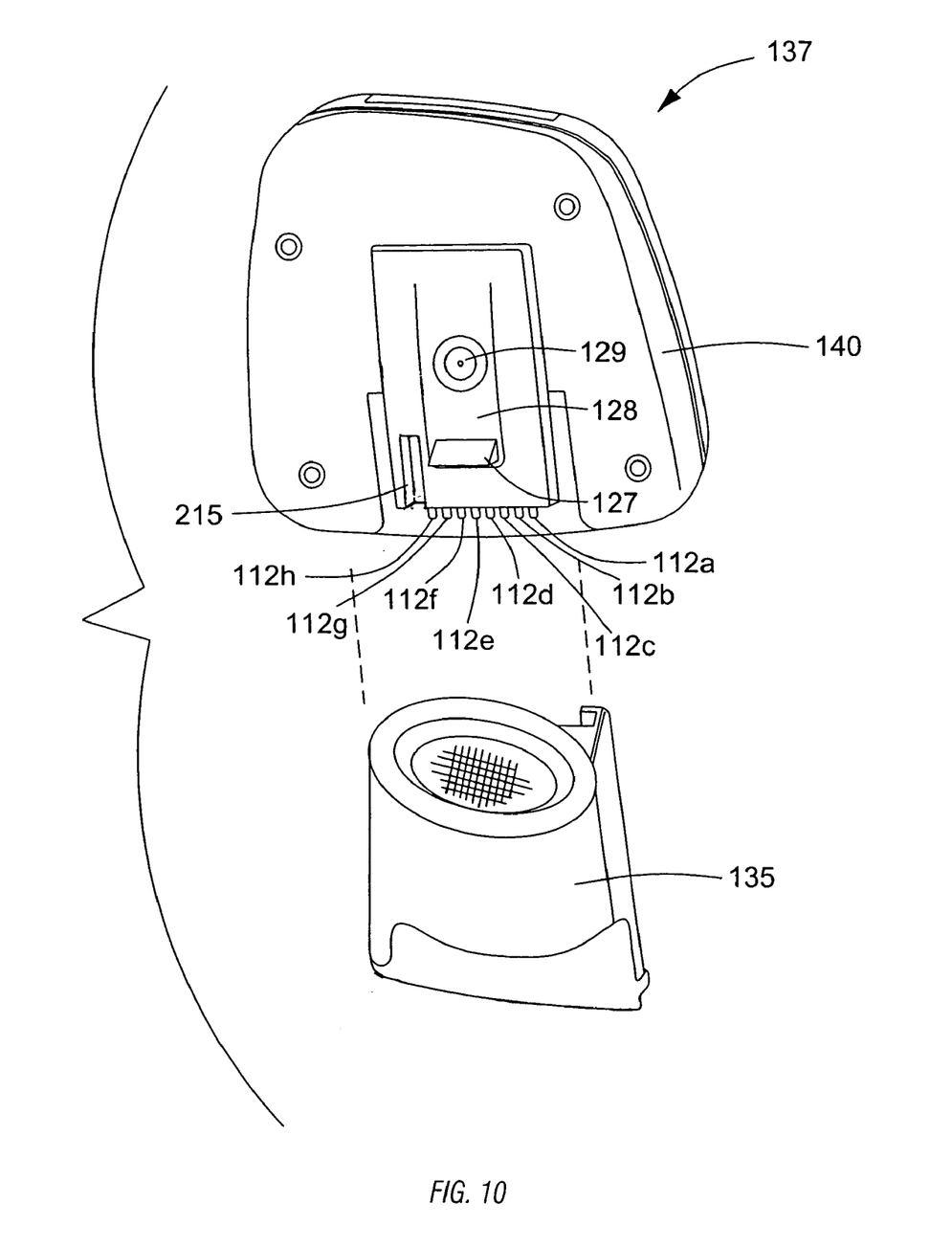
FIG. 10 is an exploded bottom perspective view of the radar detector of FIG. 2 and the receiver housing of FIG. 6.

FIG. 10 illustrates one construction of a locking member that includes the lip 127 attached to or formed as part of a flexible tab 128. The lip 127 is sized to engage one of the locking apertures 125a and 125b (FIG. 3) to lock the accessory into the receiver housing 60. The flexible tab 128 includes a button 129 that facilitates the movement of the flexible tab 128 to a disengaged position. In the disengaged position, the tab 128 is free to slide past the apertures 125a and 125b, thereby allowing for the removal of the accessory from the receiver housing 60.

The pin connectors 110a-110h are disposed adjacent the engagement portion 115 such that as the electrical accessory is pushed into position, the pins 110a-110h engage the pin-receiving members 112a-112h as the locking member engages the locking aperture 125a. In this way, the power supply circuit is completed to allow the motorcycle electrical system to deliver electrical power to the radar detector 67. In addition, two other pins 110f-110g engage two other pin-receiving members 112f-112g to complete the audio circuit such that the radar detector 67 is able to deliver a signal to the speaker 95. Of course, once the electrical accessory 65 is connected to the receiver housing 60 each of the eight pins 110a-110h connects to one of the pin-receiving members 112a-112h to complete whatever circuits may be provided in addition to the power delivery and audio circuits.

Figure 5:
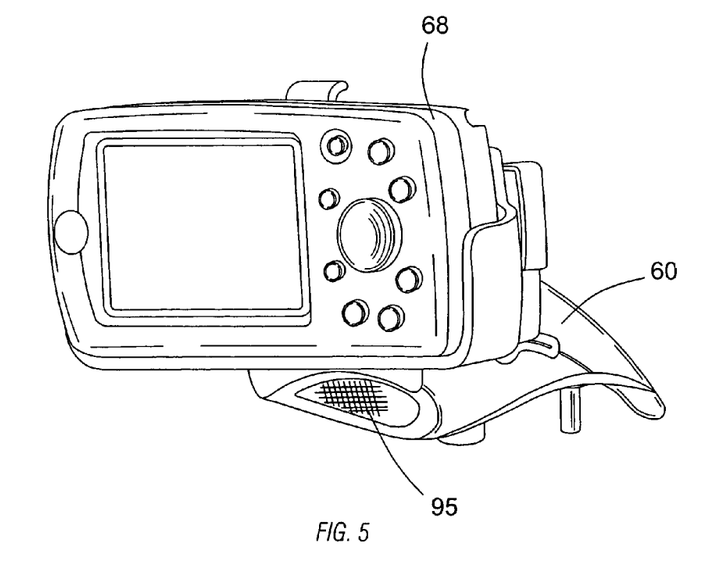
FIG. 5 is a perspective view of the receiver housing of FIG. 3 supporting a GPS receiver.

FIG. 5 illustrates the GPS receiver 68 engaged in the same receiver housing 60 as the radar detector 67 of FIG. 2, thus making the two devices 67, 68 interchangeable. As one of ordinary skill will realize, many other accessories (e.g., satellite radio receiver, MP3 player, and the like) could connect to the receiver housing 60 for use on a motorcycle 10. Thus, several accessories could alternatively be connected to the receiver housing 60 as desired by the rider of the motorcycle 10.

Figure 6:
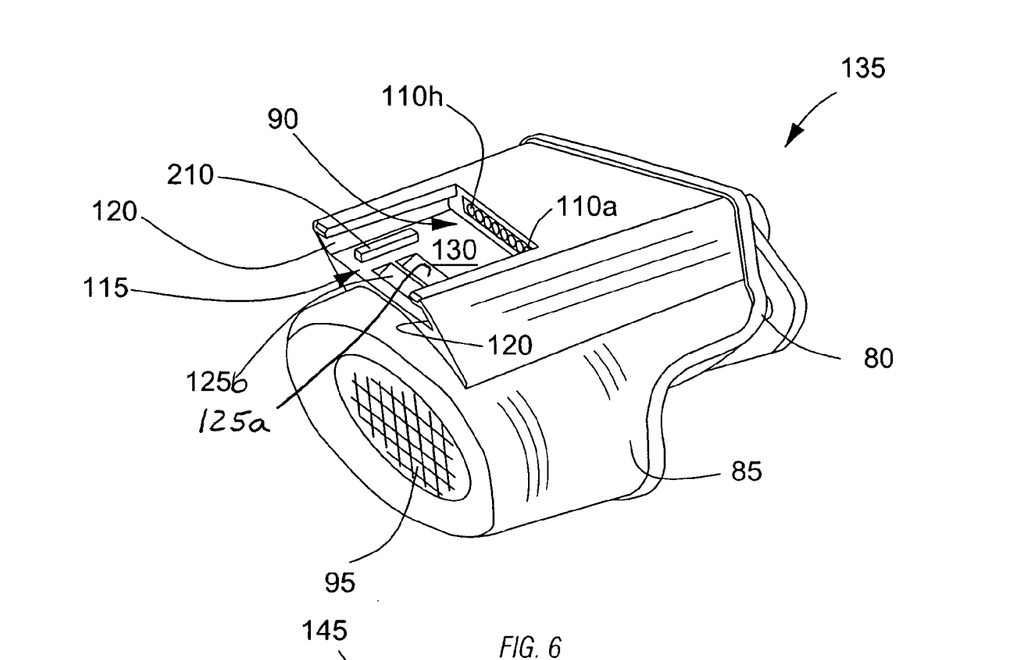
FIG. 6 is a perspective view of another construction of a receiver housing.
Figure 7:
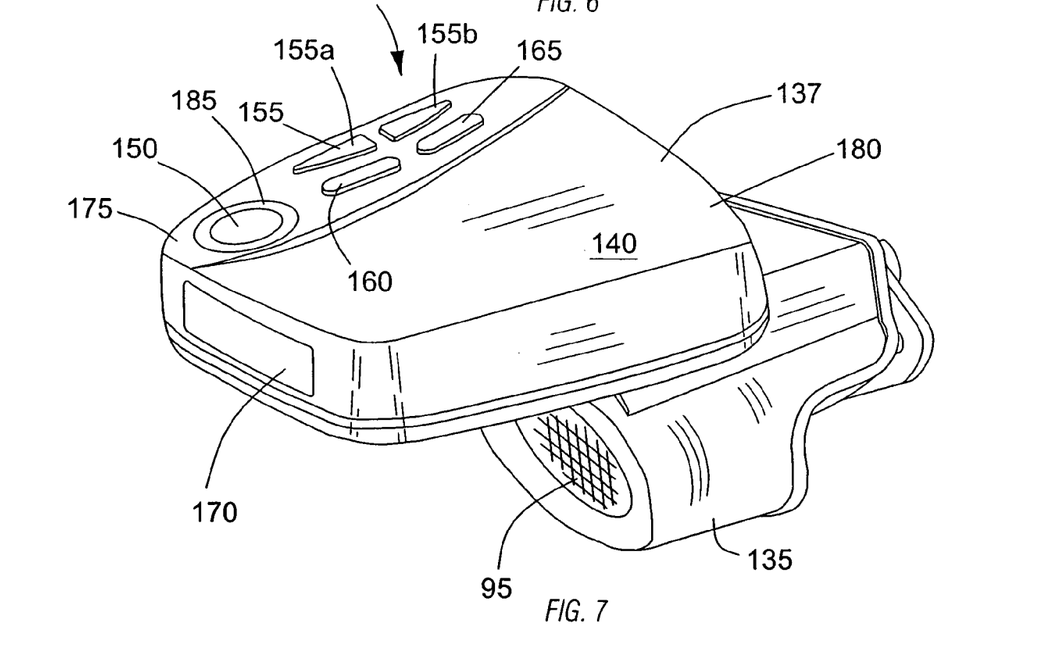
FIG. 7 is a perspective view of the receiver housing of FIG. 6 supporting the radar detector of FIG. 2.

It should be noted that the receiver housing 60 illustrated in FIGS. 2-5 is but one form of the receiver housing. FIGS. 6, 7, and 10 illustrate another construction of a receiver housing 135 that contains many of the same features as the receiver housing 60 of FIGS. 2-5. One of ordinary skill in the art will realize that there are many different shapes and configurations of receiver housings that will function as described.

Figure 8:
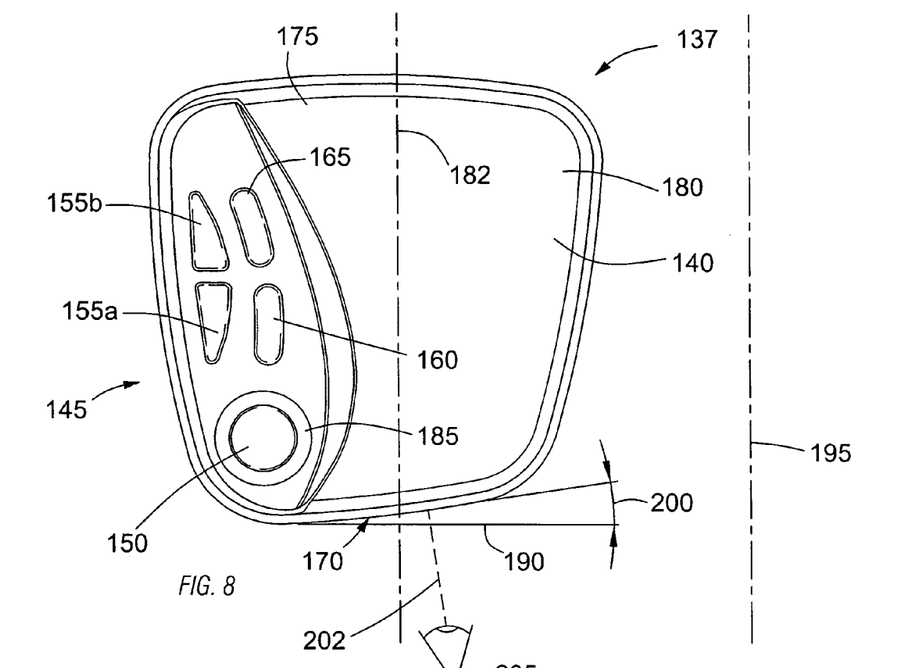
FIG. 8 is a top view of the radar detector of FIG. 2.
Figure 9:
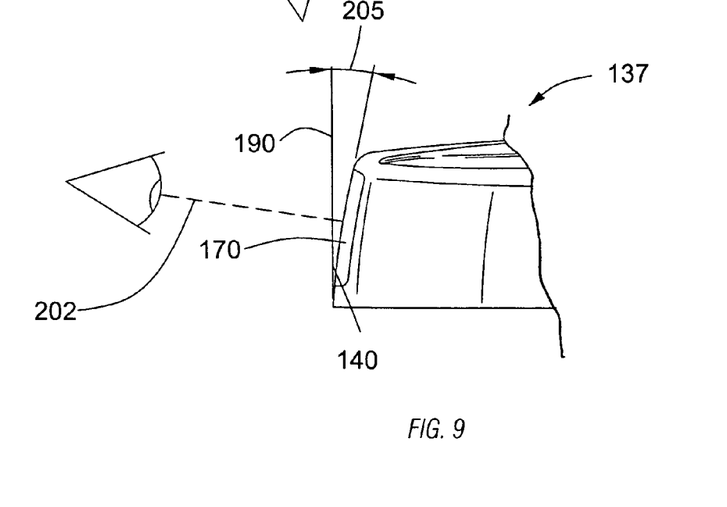
FIG. 9 is a side view of a portion of the radar detector of FIG. 2.

FIGS. 7-9 illustrate another radar detector 137 that is similar to the radar detector 67 and is suitable for use with the receiver housing 60. Before proceeding, it should be noted that the term "radar detector" is meant to encompass any detector suited to detecting electromagnetic waves including but not limited to electromagnetic radiation within the radar portion of the spectrum. As such, a detector that detects laser emissions as well as radar emissions should be considered a radar detector.

The radar detector 67 includes a housing 140 that contains electronics (not shown). The electronics detect and process electromagnetic emissions and produce output signals that can produce audio or visual representations of the detected electromagnetic radiation. Several user controls 145 extend through the housing 140 and interface with the electronics to allow the user to control various aspects of operation of the electronic device. For example, the radar detector 67 may include an on/off or power button 150 that allows the user to turn the radar detector 67 on or off. In addition, the radar detector 67 may include volume controls 155, sensitivity controls 160 (e.g., city setting and standard setting), and/or illumination controls 165. In the illustrated construction, the volume control 155 includes a volume increase button 155a and a volume decrease button 115b. In addition, a sensitivity button 160 allows the user to select between "City" mode and "Standard" mode with another button 165 selecting the illumination level of a visual display 170.

With the radar detector 67 positioned in the receiver portion 135 as shown in FIG. 7, the housing 140 includes a left-hand side 175 and a right-hand side 180 as seen from the perspective of the rider. FIG. 8 better illustrates the two halves 175, 180 with the left-hand side disposed to the left of a center plane 182 and the right-hand side disposed to the right of the plane 182. All of the user controls 145 are positioned in the left-hand side 175 of the housing 140 to allow the rider to manipulate the controls 145 with his or her left hand, while not hiding the display 170 from view. Left-hand operation of the controls 145 is also favorable because it allows the operator to maintain control of the throttle handle of the motorcycle 10 with his or her right hand.

The on/off button 150, as well as other controls, may be illuminated to make it easier for the user to find them during the evening. In the construction of FIGS. 7 and 8, the on/off button 150 is surrounded by an illuminated collar 185. LEDs or other sources of light are disposed within the housing 140 behind the collar 185 to provide the desired illumination. In other constructions, the button 150 itself is illuminated and no collar 185 is required. In still other constructions, light is provided through openings or windows provided near the user controls 145. Each of these constructions could be used to illuminate a button. In addition to making the button 150 easier to find, the illumination can be used as an indicator. For example, one construction flashes the light on and off when the radar detector 67 detects a radar (or other) signal. Thus, the flashing light provides useful information to the rider.

The housing 140 supports the display 170 at the front of the radar detector 67. The display 170 provides a visual display related to the frequency and strength of any signal being received by the detector 67. For example, the radar detector 67 may detect three primary bands of frequencies with each band represented by a different color light. To indicate the signal strength, more or less of these colored lights would be illuminated. Thus, a weak signal in a first band may illuminate one red light, while a strong signal in a second band may illuminate five green lights. The combination of the visual display and the audio tones increases the likelihood of capturing the rider's attention when necessary.

FIG. 8 illustrates the longitudinal center axis 195 of the motorcycle 10 to the right of the detector 67. FIG. 8 illustrates how the display portion 170 is angled inward toward the rider (i.e., toward the longitudinal center axis 195) at a first angle 200. The display portion 170 is angled relative to a plane 190 that is orthogonal to the longitudinal axis 195 of the motorcycle 10 to position the display portion to be orthogonal to the line of sight 202 of the rider. This is believed to reduce glare and to improve the visibility of the display 170 to the rider.

FIG. 9 is a side view of the radar detector 67 with the display 170 positioned on the left. FIG. 9 illustrates how the display portion 170 is angled upward away from the road at a second angle 205 relative to the orthogonal plane 190 to position the display portion to be orthogonal to the line of sight 202 of the rider. While many different angles will function, it has been found that first and second angles 200, 205 between about 5 and 15 degrees are well-suited to orienting the display 170 to reduce glare.

Generally, a left-hand receiver housing and a right-hand receiver housing can be provided on the motorcycle 10. The radar detector 67 is normally connected to the left-hand receiver housing. The right-hand receiver housing would allow for the connection of accessories in addition to the radar detector 67. Thus, two different accessories can be connected to the motorcycle 10 simultaneously, while still allowing the user to switch one or both of the accessories for other accessories as desired by the rider.

In some constructions, the right-hand receiver housing and the left-hand receiver housing include key arrangements that allow only certain accessories to engage the given receiver housing. Thus, the radar detector 67 may be configured to only be engageable with the left-hand receiver housing, while the GPS receiver may be configured to only be engageable with the right-hand receiver housing. Other accessories may be made to fit in only one of the left-hand housing or the right-hand housing, or to fit within either housing as desired. FIGS. 6 and 10 illustrate one possible arrangement in which a key 210 is attached to, or formed as part of the receiver housing 135 and a slot 215 is formed in the radar detector 67. Any device that does not include a slot 215 cannot be inserted into the receiver housing 135 because of the position of the key 210.

Although the invention has been described in detail with reference to certain preferred embodiments, variations and modifications exist within the scope and spirit of the invention as described and defined in the following claims.

What is claimed is:

1. A radar detector for a motorcycle having an electrical power supply and a receiver housing and defining a longitudinal axis, the radar detector comprising:
   a housing defining a center plane along which the housing is adapted to attach to the receiver housing; and
   a display panel defining a portion of the housing, the display panel disposed at a first angle relative to a plane orthogonal to the center plane and disposed at a second angle relative to the plane orthogonal to the center plane, the first angle orienting the display panel toward the longitudinal axis, the second angle orienting the display panel in an upward direction, wherein the first and second angles are fixed.

2. The radar detector of claim 1, wherein the housing includes a button disposed within the housing, the button being illuminated.

3. The radar detector of claim 2, wherein the illumination switches on and off in response to the detection of a signal.

4. The radar detector of claim 1, wherein the first angle is between about 5 and 15 degrees.

5. The radar detector of claim 1, wherein the second angle is between about 5 and 15 degrees.

6. The radar detector of claim 1, further comprising a plurality of user controls disposed within the housing, a majority of the controls disposed on a left-hand side of the housing.

7. The radar detector of claim 1, wherein the housing includes a key receiver adapted to couple to a key of the receiver housing, and wherein the key is adapted to slide substantially horizontally into an end of the housing to engage the key receiver to allow attachment between the housing and the receiver housing.

8. A radar detector for a motorcycle having an electrical power supply and a receiver housing and defining a longitudinal axis, the radar detector comprising:
   a housing adapted to attach to the receiver housing; and
   a display panel defining a portion of the housing, the display panel disposed at a first angle relative to a plane orthogonal to the longitudinal axis and disposed at a second angle relative to the plane orthogonal to the longitudinal axis, the first angle orienting the display panel toward the longitudinal axis, the second angle orienting the display panel in an upward direction, wherein the first and second angles are fixed,
   wherein the housing includes opposed lateral flanges disposed on the bottom of the radar detector, the lateral flanges configured to be slidably received in the longitudinal direction within two parallel slots of the receiver housing.

9. The radar detector of claim 8, further comprising a plurality of connectors coupled to the housing and disposed between the lateral flanges, wherein one of the plurality of connectors is a power connector and a second of the plurality of connectors is a ground connector, the power connector and the ground connector defining a portion of a power supply circuit.

10. The radar detector of claim 9, wherein the plurality of connectors includes at least four connectors arranged in a line, and wherein at least one connector is disposed between the power connector and the ground connector.

11. The radar detector of claim 9, wherein the plurality of connectors includes at least one connector that is connected to a speaker.

12. The radar detector of claim 9, wherein the plurality of connectors includes at least eight connectors arranged in a row and the power connector is one of the first connector and the eighth connector and the ground connector is the other of the first connector and the eighth connector.

13. The radar detector of claim 8, wherein the housing includes a latch mechanism disposed between the lateral flanges, the latch mechanism including a lip configured to engage an aperture in the receiver housing to retain the housing within the receiver housing.

14. The radar detector of claim 13, wherein the housing includes a button disposed between the lateral flanges and operable to move the lip from a first position to a second position when the button is depressed, the lip configured to disengage from the aperture of the receiver housing when the button is depressed.

15. The radar detector of claim 8, wherein the housing includes a button disposed within the housing, the button being illuminated.

16. The radar detector of claim 8, wherein the illumination switches on and off in response to the detection of a signal.

17. The radar detector of claim 8, wherein the first angle is between about 5 and 15 degrees.

18. The radar detector of claim 8, wherein the second angle is between about 5 and 15 degrees.

19. The radar detector of claim 8, further comprising a plurality of user controls disposed within the housing, a majority of the controls disposed on a left-hand side of the housing.

20. The radar detector of claim 8, wherein the housing includes a key receiver adapted to couple to a key of the receiver housing, and wherein the key is adapted to slide substantially horizontally into an end of the housing to engage the key receiver to allow attachment between the housing and the receiver housing.

21. A radar detector for a motorcycle having an electrical power supply and a receiver housing and defining a longitudinal axis, the radar detector comprising:
   a housing adapted to attach to the receiver housing;
   a display panel defining a portion of the housing, and
   a plurality of connectors coupled to the housing and disposed between the lateral flanges, wherein one of the plurality of connectors is a power connector and a second of the plurality of connectors is a ground connector, the power connector and the ground connector defining a portion of a power supply circuit,
   wherein the housing includes opposed lateral flanges disposed on the bottom of the radar detector, the lateral flanges configured to be slidably received in the direction of the longitudinal axis within two parallel slots of the receiver housing.

22. The radar detector of claim 21, wherein the housing includes a button disposed within the housing, the button being illuminated.

23. The radar detector of claim 21, wherein the illumination switches on and off in response to the detection of a signal.

24. The radar detector of claim 21, wherein the plurality of connectors includes at least four connectors arranged in a line, and wherein at least one connector is disposed between the power connector and the ground connector.

25. The radar detector of claim 21, wherein the plurality of connectors includes at least one connector that is connected to a speaker.

26. The radar detector of claim 21, wherein the plurality of connectors includes at least eight connectors arranged in a row and the power connector is one of the first connector and the eighth connector and the ground connector is the other of the first connector and the eighth connector.

27. The radar detector of claim 21, further comprising a plurality of user controls disposed within the housing, a majority of the controls disposed on a left-hand side of the housing.

28. The radar detector of claim 21, wherein the housing includes a latch mechanism disposed between the lateral flanges, the latch mechanism including a lip configured to engage an aperture in the receiver housing to retain the housing within the receiver housing.

29. The radar detector of claim 28, wherein the housing includes a button disposed between the lateral flanges and operable to move the lip from a first position to a second position when the button is depressed, the lip configured to disengage from the aperture of the receiver housing when the button is depressed.

30. The radar detector of claim 21, wherein the housing includes a key receiver adapted to couple to a key of the receiver housing, and wherein the key is adapted to slide substantially horizontally into an end of the housing to engage the key receiver to allow attachment between the housing and the receiver housing.

31. A radar detector for a motorcycle having an electrical power supply and a receiver housing and defining a longitudinal axis, the radar detector comprising:

a housing adapted to attach to the receiver housing; and a display panel defining a portion of the housing, wherein the housing includes opposed lateral flanges disposed on the bottom of the radar detector, the lateral flanges configured to be slidably received in the direction of the longitudinal axis within two parallel slots of the receiver housing, wherein the housing includes a latch mechanism disposed between the lateral flanges, the latch mechanism including a lip configured to engage an aperture in the receiver housing to retain the housing within the receiver housing.

32. A radar detector for a motorcycle having an electrical power supply and a receiver housing and defining a longitudinal axis, the radar detector comprising:

a housing adapted to attach to the receiver housing; and a display panel defining a portion of the housing, wherein the housing includes opposed lateral flanges disposed on the bottom of the radar detector, the lateral flanges configured to be slidably received in the direction of the longitudinal axis within two parallel slots of the receiver housing; and wherein the housing includes a key receiver adapted to couple to a key of the receiver housing, and wherein the key is adapted to slide substantially horizontally into an end of the housing to engage the key receiver to allow attachment between the housing and the receiver housing.

* * * * *